Patented June 3, 1930

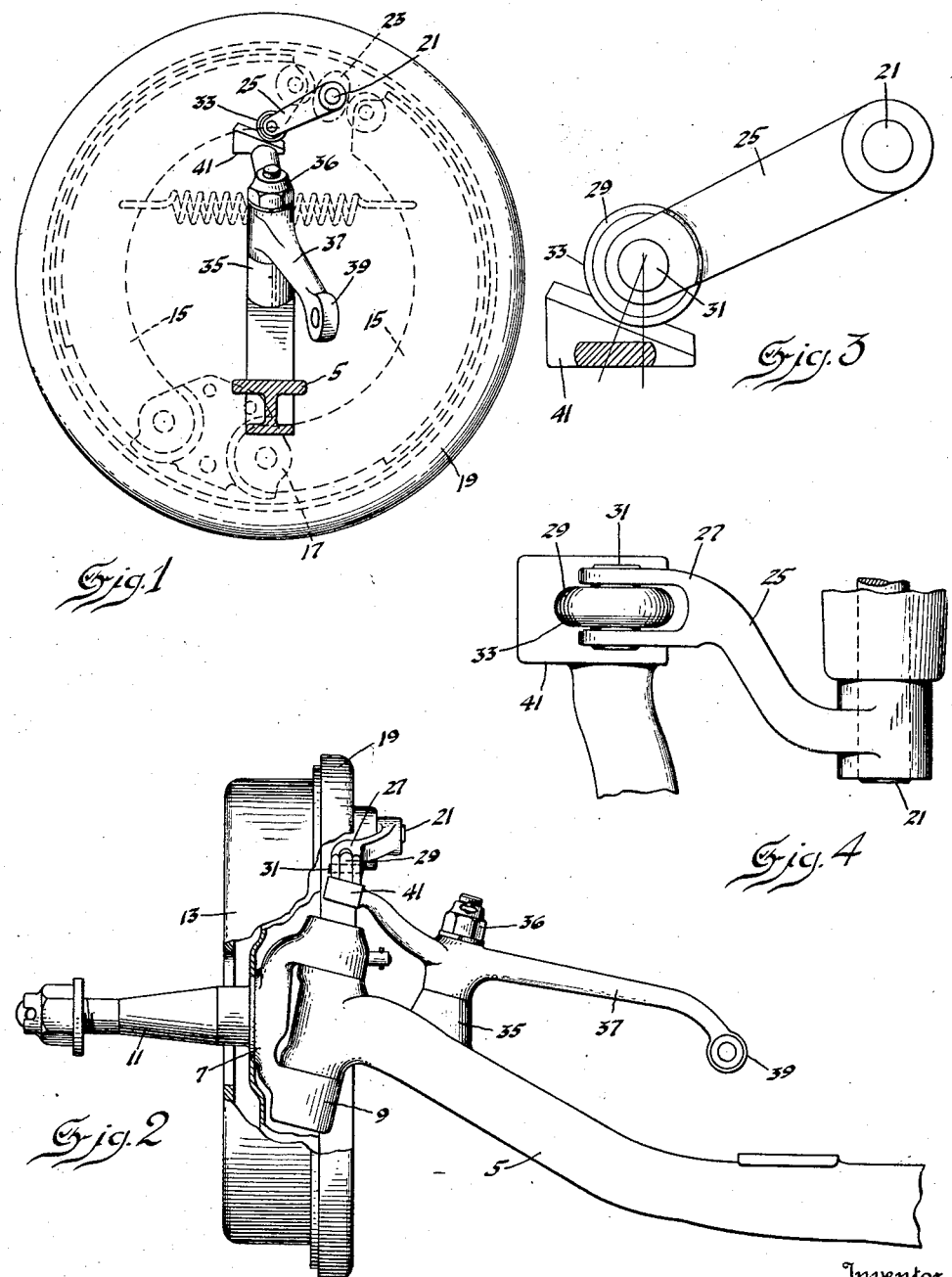

1,761,912

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

FRONT-WHEEL BRAKE

Application filed November 7, 1927. Serial No. 231,634.

This invention relates to brakes. It is intended more particularly for use with front steering wheels of vehicles.

The object of the invention is to provide means to apply a band or shoe brake mechanism to a wheel carried drum, the means being equally effective for all steering positions of the wheel. The arrangement is such that the relation of the band to the drum is not to be disturbed by the turning movement of the wheel in the act of steering. Other objects are simplicity in construction and economy in manufacture.

For a full understanding of the invention reference is made to the accompanying drawing, in which Figure 1 is a view of the brake in side elevation.

Figure 2 is a view of the axle and wheel drum in elevation, parts being broken away to show the operative mechanism.

Figure 3 is a side elevation of a detail.

Figure 4 is a plan view of the same.

Referring by reference characters to the several figures of the drawing, numeral 5 represents a vehicle axle, preferably a front axle for steering wheels. The axle shown is of the reverse Elliott type. A steering knuckle 7 is formed with forks 9 embracing the axle end and is pivoted thereto to permit swivelling movement of the wheel for steering purposes. The wheel is to be mounted for rotation on spindle 11 extending from the knuckle 7. On the wheel, not shown, is the drum 13 which is to be frictionally engaged to stop or check the rotation of the wheel by the shoe or band in the usual way. In the drawing the retarding means shown is in the form of two shoe members 15. The shoes are anchored by pivots 17 to a fixed or backing plate 19, the latter being secured by suitable fastening means, not shown, to the knuckle 7 carrying the wheel so that as the wheel swivels the plate 19 swivels with it and carries the shoes 15.

For applying the brake the shoes 15 are to be expanded into engagement with the drum. For producing this action there is rotatably mounted in the backing plate a rock shaft 21. On the end of shaft 21 within the drum is a cam 23 or its equivalent for expanding the shoes. The shaft 21 is so positioned in the backing plate that the cam is operatively located between the adjacent ends of the shoes, the ends remote from the pivots 17, and shaft 21 is also located to one side of the vertical line through the steering axis. On the inner end of shaft 21 within the backing plate 19 is an arm 25. Arm 25 extends transversely toward the swivelling axis of the wheel. Its end is forked as at 27 and carries a roller 29 mounted on a horizontal axis 31. The roller has a spherically rounded surface as at 33. The vertical axis through the center of the roller lies substantially in the vertical axis of rotation of the wheel as it swivels about the end of the axle. The rotation of arm 25 carrying the roller 29 rotates the cam and expands the brake shoes into frictional engagement with the drum.

To produce the swinging movement of arm 25 there is pivoted to the axle 5 upon a boss 35 by means of a substantially vertical pivot 36 a lever 37. The inner end of the lever is apertured as at 39 to be engaged by suitable operative linkage not shown and actuated by the usual brake pedal or lever. At its outer end the lever lies over the steering pivot between the axle and knuckle and is formed with an inclined surface or wedge 41, the lower part of which, when the brake is in released position, engages the surface of roller 29. It will be seen from Figure 3 that the point of contact between the wedge and the roller is removed from within the vertical line through the center of the roller which latter, as has been stated above, passes substantially through the swivelling axis of the wheel. To expand the shoes and apply the brake the lever is rocked so that its wedge moves to the right as shown in Figure 1 and rocks arm 25 clockwise about its axis 21. As the lever is thus moved the thicker part of the wedge rocks the arm 25 and also the cam. In such action the arc of movement of arm 25 is small and the center of the roller through the movement of the arm departs only to a negligible extent from the said swivelling axis. Should the wheel be turned in steering the lever 37 and the wedge member 41 do not partake of this swivelling movement but the arm 25 and the roller 29 do swing about the axis of oscillation which, as has been stated, passes through the vertical axis of the roller. The contact point between the roller and the wedge being somewhat removed from the vertical center line of the roller results in the point of contact traveling in a limited circular arc about the vertical axis as a center as the wheel is steered. Since the vertical axis through the roller remains for all positions of braking substantially in the axis of wheel swivelling the turning of the wheel is possible with no appreciable effect upon the degree of brake application, the roller contact point at all times describing a short arc on the surface of the wedge.

Although the invention has been described as used with shoes within the drum it will be understood that it may also be used with a band brake wherein the cam is located between the adjacent ends of the band.

I claim:

1. In a brake, a rotatable drum, brake mechanism within the drum, expanding means therefor, a rock shaft carrying said expanding means and having an arm, an actuating lever, a wedge on said lever engaging said arm to rock the shaft and apply the brake.

2. In a brake, a rotatable drum, brake mechanism within the drum, expanding means to apply the brake mechanism, comprising a rock shaft having an arm, a roller on said arm, an operating means, a wedge on said means, said wedge having an inclined surface in constant engagement with said roller, the movement of said wedge swinging said arm and applying the brake by the engagement of the roller with successive points along the inclined surface of the wedge.

3. In a brake, a rotatable drum, brake mechanism therewithin, expanding means for applying said brake mechanism, comprising a rock shaft carrying said expanding means, an arm on said rock shaft, a roller on said arm, operating means including a wedge having an inclined surface engaging said roller, the center of the roller lying in the axis of oscillation of the drum and the movement of said wedge causing the swinging of said arm by the engagement of the roller with successive points on the inclined surface of the wedge.

4. The invention defined by claim 3, the contact point of said roller with the wedge being spaced from the axis of oscillation.

5. In brake mechanism, means to apply a brake including actuating means and operating means, one in the form of a roller, the other in the form of an inclined plane, the parts positioned and movable so that the roller may move up and down the transverse plane and also transversely across the said plane.

6. In brake mechanism, means to apply a brake including actuating means and manually operating means, one including the roller, the other a wedge having an inclined surface engaging the roller, the roller and wedge swinging about axes substantially at right angles to each other.

7. In brake mechanism, means to apply a brake including actuating means and manually operating means, one including the roller, the other including a wedge having inclined surfaces engaging the roller, the roller and wedge swinging about an axis substantially at right angles to each other, said roller having a further movement about a vertical axis through its center such that the contact point between the roller and wedge describes the circular arc on the inclined surface of the wedge.

8. In a brake for vehicles, an axle, the wheel knuckle swivelled thereto, a wheel drum, a backing plate rigid with and swivelling with the knuckle, brake mechanism within said drum and carried by said backing plate, means to actute said brake mechanism including a rock shaft, said rock shaft being removed from the vertical swinging axis, an arm on said rock shaft extending transversely to that axis, a lever pivoted on the axle, said lever extending longitudinally the the axle and terminating in an inclined surface engaging the end of said arm.

9. The invention defined by claim 8, the end of said arm having a roller, the vertical central axis of which lies substantially within the swivelling axis, and the point of contact of the roller with the inclined surface being, for all positions of said lever, spaced from the said vertical axis.

10. In a brake, a drum, brake mechanism, means swivelling with the wheel end directly engaging said brake mechanism to move said brake mechanism into frictional contact with said drum, manually operated lever means provided with an inclined surface bodily moveable longitudinally to engage said means at successive points on its inclined surface as the lever means is actuated.

11. In a brake, an axle, a swivelling wheel knuckle, a drum and closure plate swivelling with said knuckle, brake means to frictionally engage the drum, means swivelling with the wheel to effect the said frictional engagement, lever means not swivelling with the wheel and having a part immovable relative thereto formed as an inclined surface operably engaging said brake applying means at successive points along said inclined surface as the lever is operated.

12. In a brake for swivelling wheels, a brake actuating means swivelling with the wheel and movable to actuate the brake, manually movable operating means including as a part thereof a wedge, the wedge having an inclined surface in constant engagement with said actuating means at successive points on its inclined surface whereby the movement of said actuating means by said operating means applies the brake through the engagement of the actuating means with the successive points of the inclined surface of the wedge.

In testimony whereof I affix my signature.

ALBERT W. FREHSE.